(12) United States Patent
Bonnet et al.

(10) Patent No.: US 12,260,235 B2
(45) Date of Patent: Mar. 25, 2025

(54) VISUAL ASSIST CHATBOT FOR IMPROVED ACCESSIBILITY OF CONTENT BY A VISUALLY IMPAIRED USER

(71) Applicant: MASTERCARD INTERNATIONAL INCORPORATED, Purchase, NY (US)

(72) Inventors: Marion Bonnet, Miami, FL (US); Ankurjyoti Bordoloi, Guwahati (IN); Karan Paresh Trivedi, Mumbai (IN)

(73) Assignee: MASTERCARD INTERNATIONAL INC., Purchase, NY (US)

( * ) Notice: Subject to any disclaimer, the term of this patent is extended or adjusted under 35 U.S.C. 154(b) by 0 days.

(21) Appl. No.: 18/322,581

(22) Filed: May 23, 2023

(65) Prior Publication Data
US 2024/0394078 A1  Nov. 28, 2024

(51) Int. Cl.
*G06F 9/451* (2018.01)
*G06F 3/16* (2006.01)
(Continued)

(52) U.S. Cl.
CPC .............. *G06F 9/453* (2018.02); *G06F 3/167* (2013.01); *G06F 40/106* (2020.01); *H04L 51/02* (2013.01)

(58) Field of Classification Search
CPC ........ G06F 9/453; G06F 3/167; G06F 40/106; H04L 51/02
See application file for complete search history.

(56) References Cited

U.S. PATENT DOCUMENTS

| 8,166,135 B2 | 4/2012 | Ganesh et al. |
| 9,575,624 B2 | 2/2017 | Voorhees et al. |

(Continued)

FOREIGN PATENT DOCUMENTS

| CN | 103888573 | 2/2017 |
| CN | 111767019 | 10/2020 |
| KR | 100747724 B1 | 8/2007 |

OTHER PUBLICATIONS

Singh, A., "Web Access for Visually Impaired", Galgotias University, Apr./May 2020, 86 pages.
(Continued)

*Primary Examiner* — Patrick F Riegler
*Assistant Examiner* — Alvaro R Calderon, IV
(74) *Attorney, Agent, or Firm* — Barta Jones, PLLC

(57) ABSTRACT

Examples provide a system for automatically identifying a user with a visual impairment and providing assistance navigating a website. A visual assist (VA) manager monitors user interactions with a webpage, such as zooming-in to increase the size of text and graphics and navigation errors, such as clicking on an area outside a clickable icon, failing to enter text in the correct field, etc. A trained machine learning model analyzes the user interaction data using visual assist criteria to predict whether the user has a visual impairment. If the VA manager predicts a visual impairment, an audible VA activation prompt is provided to the user. If the user activates the VA manager, a chatbot is provided to assist the user in performing tasks while navigating the webpage. The VA manager optionally applies user-specific VA settings adjusting the webpage layout and appearance to accommodate the user's visual impairment.

20 Claims, 10 Drawing Sheets

(51) Int. Cl.
*G06F 40/106* (2020.01)
*H04L 51/02* (2022.01)

(56) References Cited

U.S. PATENT DOCUMENTS

| | | | |
|---|---|---|---|
| 9,704,216 | B1 | 7/2017 | Laskar et al. |
| 10,314,477 | B1 | 6/2019 | Goodsitt et al. |
| 11,252,113 | B1* | 2/2022 | Orkin .................. G06F 3/167 |
| 11,482,133 | B2 | 10/2022 | O'Reilly et al. |
| 11,636,252 | B1* | 4/2023 | Myers ............... G06F 40/143 715/234 |
| 11,645,446 | B1* | 5/2023 | Parish ............... G06F 40/186 715/229 |
| 11,929,963 | B1* | 3/2024 | Zheng .................... H04L 51/02 |
| 2002/0065658 | A1* | 5/2002 | Kanevsky ........ G06F 16/9574 704/260 |
| 2005/0041040 | A1* | 2/2005 | Fukuda .................. G06T 5/30 345/619 |
| 2008/0204471 | A1 | 8/2008 | Jaegar et al. |
| 2012/0254405 | A1 | 10/2012 | Ganesh et al. |
| 2014/0058733 | A1* | 2/2014 | Voorhees ........... G06F 3/04847 704/260 |
| 2014/0153825 | A1 | 6/2014 | Jones et al. |
| 2014/0282007 | A1* | 9/2014 | Fleizach ................ G06F 9/453 715/728 |
| 2015/0121215 | A1* | 4/2015 | Wohlert ............... G06F 3/0484 715/706 |
| 2017/0269816 | A1* | 9/2017 | Bradley ................ G10L 13/027 |
| 2017/0358256 | A1 | 12/2017 | Ross et al. |
| 2018/0063325 | A1 | 3/2018 | Wilcox et al. |
| 2019/0004665 | A1* | 1/2019 | Wee .................. G06F 3/04186 |
| 2019/0179608 | A1* | 6/2019 | Kothari ............. G06F 16/9535 |
| 2019/0252054 | A1* | 8/2019 | Dirani ................... G16H 20/30 |
| 2020/0034589 | A1* | 1/2020 | Calhoun ............. G06K 7/1417 |
| 2020/0129061 | A1* | 4/2020 | Goodsitt ............ G06F 16/2457 |
| 2020/0159790 | A1* | 5/2020 | Barbosa ............. G06F 16/9558 |
| 2021/0072949 | A1* | 3/2021 | Chisu ............... H04N 21/42202 |
| 2021/0081165 | A1* | 3/2021 | Deshmukh .............. G06N 20/00 |
| 2022/0013228 | A1* | 1/2022 | Gonzalez Garcia ... A61B 3/005 |
| 2022/0084438 | A1* | 3/2022 | Bansal .................. G06F 16/957 |
| 2022/0222301 | A1* | 7/2022 | Liu ....................... G06F 16/957 |
| 2022/0238105 | A1* | 7/2022 | Goldfarb ................. G06F 3/167 |
| 2022/0366131 | A1* | 11/2022 | Ekron .................. G06F 16/958 |
| 2023/0067615 | A1* | 3/2023 | Bond .................... G06V 10/768 |
| 2023/0095109 | A1* | 3/2023 | Giri ...................... G06Q 30/016 705/14.23 |
| 2023/0195480 | A1* | 6/2023 | Zhang ................... G06F 9/453 715/708 |
| 2023/0403244 | A1* | 12/2023 | Blandin ................. H04L 51/02 |
| 2024/0111961 | A1* | 4/2024 | Kwok .................. G06F 3/0481 |

OTHER PUBLICATIONS

Wu, H. et al., "Towards accessible news reading designing virtual reality for low vision", Mulitimedia Tools and Applications, vol. 80, May 16, 2021, 17 pages.
Vorm, R., "Improve Accessibility for Users Who are Visually Impaired with These 9 Tips", How to Make Websites Accessible for the Visually Impaired—Fuzzy Math, 2009, 19 pages.
Unknown, "How to Build a User-Friendly Website for the Visually Impaired in 2021", Website Setup, Jan. 25, 2022, 28 pages.
Unknown, "WebbIE", Retrieved on May 23, 2023 here: https://www.webbie.org.uk/, 3 pages.
Theofanos, M. et al., Helping Low-vision and Other Users with Web Sites That Meet Their Needs: Is One Site for All Feasible?, Applied Research, Technical Communication, vol. 52, No. 1, Feb. 2005, 12 pages.
American Foundation for the Blind, "Screen Readers", Retrieved on May 23, 2023 here: https://www.afb.org/blindness-and-low-vision/using-technology/assistive-technology-products/screen-readers, 5 pages.
American Foundation for the Blind, "Screen Magnification Systems", Retrieved on May 23, 2023 here: https://www.afb.org/node/16207/screen-magnification-systems, 5 pages.
Pina et al., 'Bringing Cognitive Augmentation to Web Browsing Accessibility', http://arxiv.org, arXiv:2012.03743v1, pp. 1-13, Dec. 7, 2020, pp. 1-3.
Yang, Jeong Rok, "International Search Report & Written Opinion", International Application No. PCT/US2024/019344, mailed Jul. 4, 2024, 10 pages.

* cited by examiner

VISUAL ASSIST CHATBOT FOR IMPROVED ACCESSIBILITY OF CONTENT BY A VISUALLY IMPAIRED USER

BACKGROUND

Users with visual impairments frequently have difficulty navigating websites and online content due to difficulty distinguishing text in varying colors, small font sizes, overlapping content, and other page layout features. Users can use magnification features to enlarge or zoom-in on content. However, magnification can make it more difficult to read text and navigate web page content due to narrowing of viewable content within the magnified area. Likewise, magnification does not assist users with navigating webpage content where the user is color blind or otherwise unable to see all elements of the content due to blindness or other visual impairments.

SUMMARY

Some examples provide a system for assisting visually impaired users navigating websites. The system generates user interaction data describing user interaction with a webpage in real-time as a user navigates the webpage via a user interface (UI) device. A visual assist (VA) manager predicts a presence of a visual impairment of the user using a trained machine learning (ML) model. The ML model analyzes the user interaction data using one or more visual impairment criteria to generate the prediction. A VA chatbot is activated if the ML model predicts a visual impairment. The VA chatbot assists the user in performing a task during navigation of the webpage.

Other examples provide a method for providing assistance to visually impaired users navigating websites. The VA manager observes user interaction with a webpage in real-time as a user navigates the webpage via a UI device. The VA manager generates user interaction data describing the user interaction with the webpage. The VA manager predicts a visual assist level of the user using an ML model. The ML model analyzes the user interaction data using one or more visual impairment criteria. The visual assist level indicates a degree of visual impairment of the user. The VA manager generates an audible visual assist (VA) activation prompt via the UI device in response to the visual assist level exceeding a threshold minimum value. The VA manager activates a VA chatbot to assist the user in performing a task during navigation of the webpage in response to VA activation by the user.

Still other examples provide a computer storage device having computer-executable instructions stored thereon, which, upon execution by a computer, cause the computer to generate user interaction data describing user interaction with a webpage in real-time as a user navigates the webpage via a user interface (UI) device. The presence of a visual impairment associated with the user is predicted by a trained machine learning (ML) model using the user interaction data and one or more user-configurable visual impairment criteria. An audible visual assist (VA) activation prompt is generated via the UI device in response to the trained ML model predicting the presence of the visual impairment. A VA chatbot is activated in response to VA activation by the user. The VA chatbot assists the user in performing a task during navigation of the webpage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
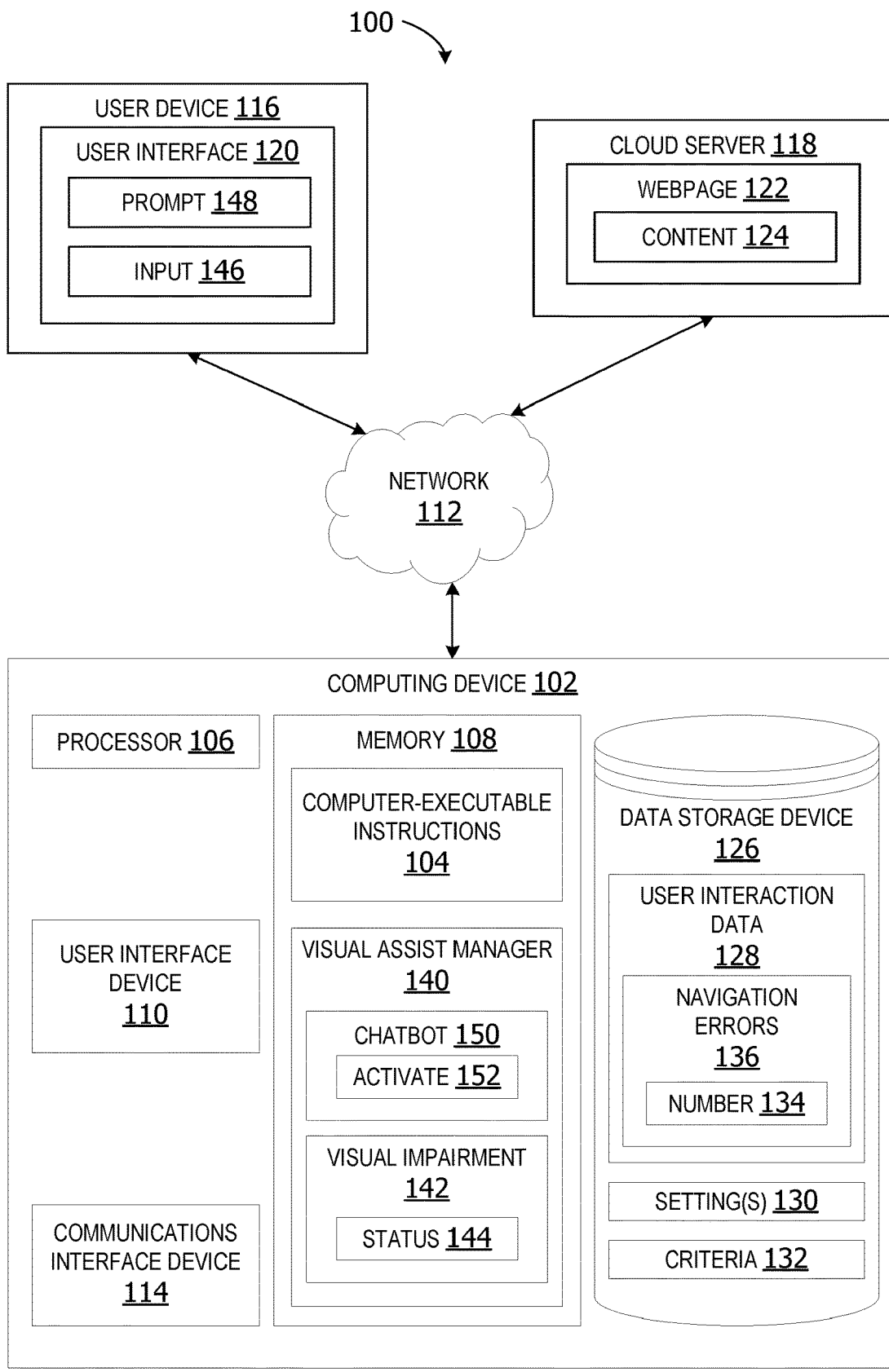
FIG. 1 is an exemplary block diagram illustrating a system including a visual assist (VA) manager for detecting visually impaired users navigating webpage content and activating a VA chatbot.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ". For brevity and clarity of presentation, this implied leading clause is not repeated ad nauseum.

There are currently billions of people worldwide that have some form of visual impairment. A significant number of those with visual impairments also have advanced internet proficiency, which indicates that the visual impairments do not deter users from engaging with online content. However, these users with visual impairments, such as low vision users, color blind users, legally blind users, frequently have difficulty navigating online content due to current technological limitations, such as various text fonts sizes, colors, overlapping graphics, small areas or target zones around a clickable icon which registers user clicks, inability to view the entire page when using zoom or other magnification functions, etc.

The lack of audio descriptors on websites makes it burdensome for blind and other visually impaired users to execute tasks on the platform independently without the presence of a colleague to physically help them. Likewise, color blind users are frequently unable to identify important text, links, and call to actions that are differentiated in webpage content only by color. This complicates the user's navigation and makes it time consuming to submit forms with required fields when such fields are only differentiated by color. Small text and low color contrast can further make text illegible for other users with low vision. This makes it difficult to navigate the platform, resulting in degraded human-machine interactions. These and other issues make it frustrating, time-consuming, and technologically inefficient for users with visual impairments navigating online content.

Referring to the figures, examples of the disclosure provide an improved human-machine interface, including a visual assist (VA) manager that enables improved accessibility to webpage content by visually impaired users. In some examples, the VA manager monitors user interactions with content of a webpage in real-time as the user navigates the webpage via a user interface (UI) device. The user interactions can include clicking on "clickable" graphics, such as buttons, icons, tabs, links, etc. The user interaction can also include magnifying content or using a zoom function to enlarge text or other displayed graphics. The user interactions can also include elapsed time required for a user to complete a task, user alterations to font size of text, user changes to brightness and/or contrast levels, as well as any other actions or interactions which indicate the user is having difficulties viewing the original webpage.

In other examples, the VA manager generates per-user, customized user interaction data describing each user's user interaction with the webpage. The user interaction data is utilized by the VA manager to automatically determine if the user is likely to have a visual impairment or otherwise require assistance navigating the webpage without requiring the user to take a visual assessment test. Thus, in these examples, the system automatically provides assistance to users while reducing system resource usage associated with providing individual visual assessment tests.

In other aspects, the system includes a trained machine learning (ML) model that predicts the presence or absence of a visual impairment for each user based on user interaction data for the user. This enables streamlined visual impairment determinations while eliminating user time spent taking visual assessment tests. This further improves the user experience navigating the webpage for visually impaired users.

Other examples provide an ML model that predicts a visual assist level of the user by analyzing the user interaction data. The visual assist level enables the system to determine the type or degree of visual impairment for each user. For example, a user with only a mild visual impairment might benefit from a mild increase in font size and reduction of visual clutter in the display while a user with a higher level of visual impairment requires assistance from the VA chatbot to successfully navigate the webpage content and functions. This enables more accurate and customized visual assistance for each user.

Automatic prediction of the presence or level of visual impairment of the user is performed by the ML model using available user-specific interaction data. In some examples, this enables more accurate and efficient determination of visual impairment without employing typical visual assessment tests to further reduce system processor load and network resource usage.

Still other examples provide an audible visual assist (VA) activation prompt via the UI device of the user in response to a prediction of a visual impairment. This enables the system to prompt or remind the user that the VA chatbot and other features are available to assist the user in navigating the webpage for improved customer experience and greater efficiency deploying the visual impairment assistance resources to the user.

Yet other examples include a VA chatbot that launches automatically without a prompt if a visual impairment is predicted for improved usability of the webpage content and functionality. The VA chatbot assists the user in performing a task during navigation of the webpage in response to VA activation by the user. In this manner, the VA chatbot is made available without user intervention or manual activation for improved efficiency and convenience for the user.

The chatbot converts speech to text and performs data entry tasks for the user. In this manner, the chatbot further reduces error rate by reducing likelihood of data entry errors by visually impaired users.

The VA manager in other examples generates customized webpage layout settings for each user and stores those settings for automatic future application. For example, the VA manager identifies colors that a color-blind user cannot identify. The VA manager visually adjusts the platform layout accordingly. In addition, required fields and links are underlined and indicated with an asterisk. The VA manager determines the ideal font size and color contrast (between text and background) for the user and generates settings to adjust the content layout accordingly. This enables automatic calibration of the webpage content layout based on user visual impairment levels, preferences for improved user-experience, and reduction of undue burdens on users.

The VA manager further generates customized webpage layout and display settings to modify the content in a manner that minimizes difficulties for the user navigating the webpage content with the predicted visual disability. This feature improves user efficiency by improving text display and thereby improving reader efficiency.

In other examples, the VA manager transforms the end-to-end experience navigating webpages to a highly personalized user-experience tailored to each user's visual impairments. The system provides a webpage-specific chatbot and generates user-specific settings calibrating the webpage's visual layout to provide a user-friendly experience based on the user's specific type of visual impairment and degree of visual impairment.

The computing device operates in an unconventional manner at least by providing customized automatic assessment of visual impairments and launching a visual assistance chatbot for users predicted to have a visual impairment. In this manner, the computing device operates in an unconventional manner at least by adjusting webpage content and features for user based on predicted visual impairments of the users for improved user navigation and reduced system resource usage, thereby improving the functioning of the underlying computing device. The VA manager empowers visually impaired users to execute commands on any webpage or other platform and lessens dependence on colleagues and audio descriptors.

Referring again to FIG. 1, an exemplary block diagram illustrates a system 100 for including a VA manager for detecting visually impaired users navigating webpage content and activating a VA chatbot. In the example of FIG. 1, the computing device 102 represents any device executing computer-executable instructions 104 (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 are performed by the processor 106, performed by multiple processors within the computing device 102 or performed by a processor external to the computing device 102. In some examples, the processor 106 is programmed to execute instructions such as those illustrated in the figures (e.g., FIG. 4, FIG. 5, FIG. 6, and FIG. 7).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface 120.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers. In this example, the cloud server 118 hosts a webpage 122 having navigable content. The webpage 122 comprises content accessible to the user device via the network connection. The webpage 122 includes any type of web content. The webpage 122 can alternatively be referred to as a website, a portal page or content platform.

The user navigates the content 124 using an input device, such as, but not limited to, a touchscreen, mouse, keyboard, virtual reality (VR) headset, an augmented reality (AR) headset, or any other type of input device.

The system 100 can optionally include a data storage device 126 for storing data, such as, but not limited to user interaction data 128, per-user customized setting(s) 130 and/or one or more visual assist criteria 132. The user interaction data 128 is data describing observed user interactions with navigable content 124 of the webpage 122. The user interaction data includes a number 134 of navigation errors 136 observed during a pre-determined time period. In some examples, navigation errors 136 include user misses. A miss is a user attempt to click on an icon, button or other graphic. The user interaction data in other examples further includes use of magnification to enlarge content of the webpage, elapsed time until a user successfully performs a task, entering text into an incorrect text field, or any other user interaction with content of the webpage.

The setting(s) 130 includes per-user settings for altering, adjusting, or otherwise changing the layout or appearance of the webpage content making the content easier to view and/or easier to navigate. The setting(s), in some examples, include font size, font color, location of graphics, color of graphics, placement of text fields, size of text fields, number of objects within a field of view (FOV), or any other layout.

The criteria 132 includes one or more rules for determining whether a user is visually impaired. In one example, the criteria 132 includes a minimum threshold number of navigation errors. If the number of navigation errors detected during a given time-period exceeds the minimum threshold, the system predicts the user has a visual impairment. In one example, the criteria include a rule stating that if the user has three misses within a five-minute time period, the user likely has a visual impairment.

The criteria are not limited to a threshold number of hits or misses for determining whether the user likely has a visual impairment. In other examples, the criteria include rules associated with the number of clicks within a threshold percentage (x %) of area outside links/buttons. In another example, the criteria include the number of clicks on call to action, including links, buttons, text fields, etc. The criteria, in still other examples, include the magnification percentage above a threshold, text size below a threshold number of points, use of a keyboard for navigation, amount of back-and-forth movement during navigation, brightness changes on the device, and identification of low color contrast.

The criteria 132 in this example are a set of pre-defined rules or parameters applied to input 146 and other user interaction data to identify visually impaired users automatically without applying a visual impairment test or evaluation. In other examples, the criteria are configurable by the user, a developer, or a machine (e.g., automatically). In still other examples, the VA manager 140 adjusts or updates the criteria based on training data and/or user-feedback.

The data storage device 126 can include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In other examples, the data storage device 126 includes a database.

The data storage device 126 in this example is included within the computing device 102, attached to the computing device, plugged into the computing device or otherwise associated with the computing device 102. In other examples, the data storage device 126 includes a remote data storage accessed by the computing device via the network 112, such as a remote data storage device, a data storage in a remote data center, or a cloud storage.

The memory 108 in some examples stores one or more computer-executable components, such as the visual assist (VA) manager 140. The VA manager 140 component is executed by the processor 106 of the computing device 102. In some examples, the VA manager 140 observes user interaction with the content 124 of the webpage 122. The VA manager 140 generates user interaction data 128 describing user interaction with the webpage 122 in real-time as the user navigates the webpage 122 via the user interface (UI) 120 associated with the user device 116. The VA manager 140 includes an ML model which is used to analyze the user interaction data 128. In this example, the VA manager 140 applies the criteria 132 to the user interaction data 128 to determine a visual impairment 142 status 144 of the user.

The status 144 indicates the presence or absence of a visual impairment. In other examples, the status 144 includes a level of visual impairment. The level indicates the degree of visual impairment. A user with no visual impairment, in some examples, has a low level or level of zero. A user with a moderate visual impairment is middle level rank. A user that is legally blind is assigned a higher level.

The VA manager 140 generates an audible visual assist (VA) activation prompt 148 via the UI device in response to the trained ML model predicting the presence of the visual impairment in some examples. The prompt 148 is output to the user via a speaker or other audio output device associated with the user device 116. The prompt requests user acceptance or permission to activate 152 a VA chatbot 150.

In one example, the prompt 148 is an audible query asking, "would you like visual impairment assistance?" In other examples, the prompt 148 states, "do you want to activate the visual assist chatbot?" In another example, the prompt 148 states "say the word 'activate' to activate the visual assist chatbot." The examples are not limited to these prompts or activation words. Any audible prompt or activation word(s) can be utilized to prompt the user to activate the VA chatbot.

The VA chatbot 150 is a natural language processing (NLP) chatbot capable of receiving verbal (natural language) commands from the user and executing those commands automatically. The VA chatbot assists the user in performing a task during navigation of the webpage in response to VA activation by the user. The VA chatbot is specialized to provide assistance to visually impaired users navigating online content, such as the webpage 122. The chatbot receives verbal commands from the user and performs tasks on the webpage in accordance with the user's verbal commands. The chatbot executes commands for the visually impaired user without friction while eliminating the user's dependence on colleagues or other human assistance.

The commands include any type of chatbot commands. In one example, the command includes a user saying, "take me to the store." In another example, the user commands the chatbot to "open XYZ file." Another example command includes "add ABC application to my favorites." In still other examples, the user commands the chatbot to "enter my address into the address field." The examples are not limited to these chatbot commands. The chatbot is available to execute commands associated with any type of task or function capable of being performed by non-visually disabled users.

In one example, the user commands the VA chatbot to open a link to a document. The VA chatbot automatically opens the requested document in another window for viewing by the user. The VA chatbot converts text to speech. The VA chatbot likewise converts speech into text. In other examples, the VA chatbot fills text into text fields, clicks on clickable icons, fills out forms automatically (auto-fill), as well as other webpage tasks.

In this manner, the system provides auto-activation of a VA chatbot and automatic calibration of webpage settings to help visually impaired users based on ML observation of the user's interactions with the webpage content. For example, if the VA manager detects a threshold number of misses as the user tries to navigate the site, the VA manager issues a prompt offering to provide visual impairment assistance to the user. The activated chatbot helps the user complete transactions, obtain information from the website, as well as other tasks.

In some examples, the system improves and streamlines the user-experience on webpages for visually impaired users with the combination of automated visual adjustments and a virtual assistant chatbot. The end-to-end experience is transformed to provide a highly personalized user-experience tailored to each user's visual impairments.

In this example, the VA manager automatically assesses the level of visual impairment based on the user's interactions with the content of the webpage. In another example, the VA manager assesses the level of visual impairment based on the user's interactions with the webpage content and the results of a visual assessment test. In this example, at the launch of the VA chatbot or when a new account is created, users are invited to take a one-time visual impairment assessment which consists of three exercises and requires a minimal amount of time to complete, such as one or two minutes. These scientifically established exercises assess the user's visual capabilities and automatically calibrate the platform's visual layout to provide a user-experience that is customized to the user's visual impairment and help them better navigate the platform. These settings are saved for all future logins. The VA chatbot is available to help the user execute certain tasks and remove undue burdens when navigating the webpage or platform.

Figure 2:
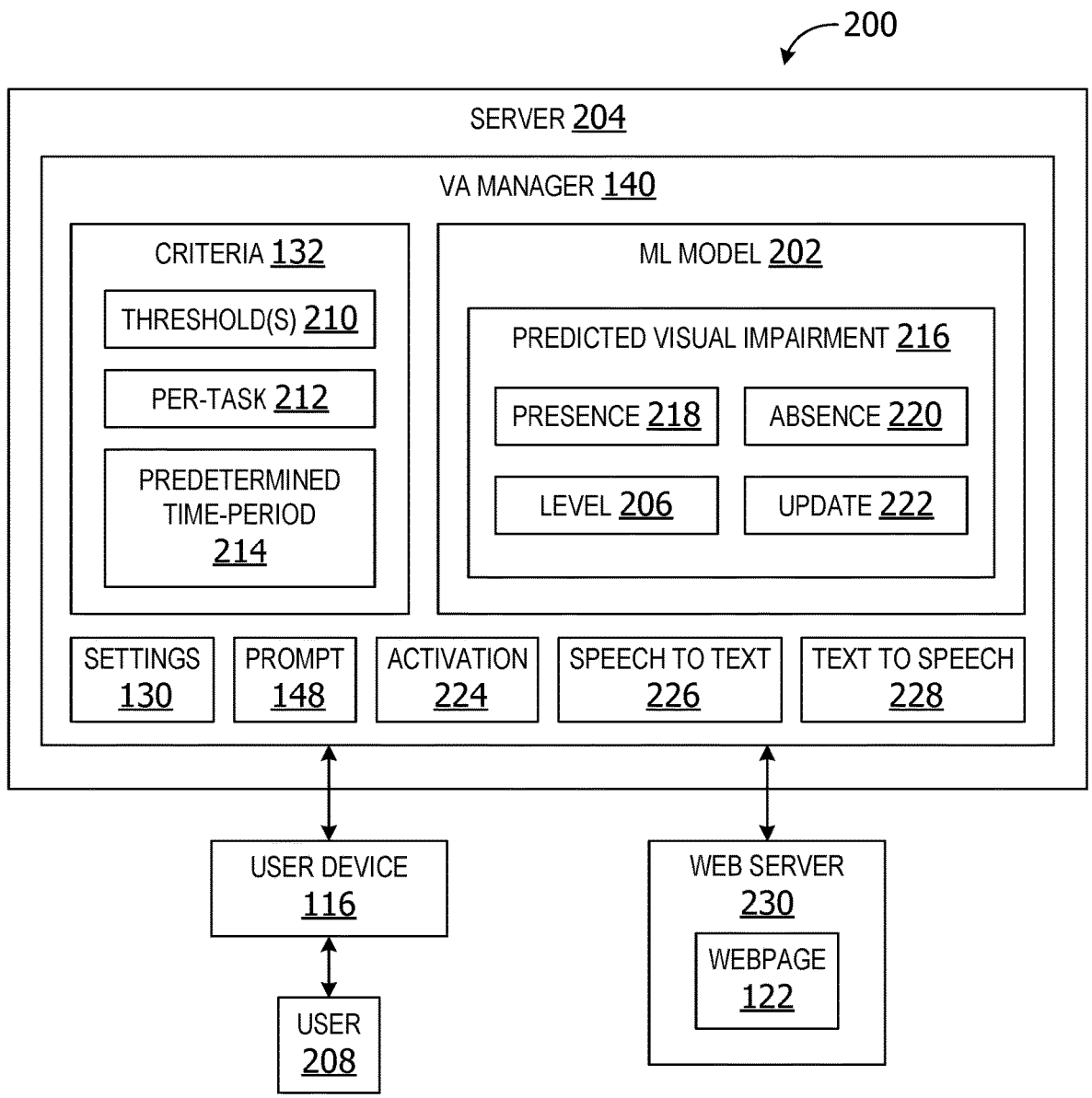
FIG. 2 is an exemplary block diagram illustrating a system including a VA manager having a trained machine learning (ML) model for predicting a level of visual impairment based on user interaction data.

FIG. 2 is an exemplary block diagram illustrating a system 200 including a VA manager 140 having a trained ML model 202 for predicting a level 206 of visual impairment based on user interaction data. The level of visual impairment is used to classify the user as visually impaired or unimpaired. The level is also used to determine the type of visual impairment and/or the degree or severity of visual impairment.

In this example, the VA manager 140 is hosted on a server 204. The server 204 is implemented as a computing device, such as the computing device 102 in FIG. 1. In other examples, the server 204 is a cloud server, such as, but not limited to the cloud server 118 in FIG. 1.

The VA manager 140 includes an ML model 202. The ML model is a trained ML model using artificial intelligence to predict whether a user likely has a visual impairment. The VA manager 140 observes the interaction of a user 208 with the webpage 122 in real-time as the user 208 navigates the webpage 122 via a UI of the user device 116. The VA manager 140 generates the user interaction data describing the user interaction with the webpage 122.

The webpage 122 is hosted on a web server 230 in this example. In this example, the web server 230 is a computing device, such as computing device 102 in FIG. 1. In still other examples, the web server 230 is a cloud server, such as, but not limited to, the cloud server 118 in FIG. 1.

The trained ML model 202 analyzes the user interaction data using one or more criteria 132. The criteria 132 includes threshold(s) 210 and other rules applied to the user interaction data to determine whether the user is likely to be visually impaired. In some examples, the criteria 132 are per-task 212 rules. In other words, one set of criteria is applied to some tasks while different criteria are applied to other tasks. For example, the criteria can include a threshold number of misses used to indicate a visual impairment which is applied to tasks associated with opening folders, activating links, closing windows, or other click-related tasks. In this example, different criteria specifying a predetermined time period 214 for entering text into a text field is applied to tasks associated with entering or typing text into text fields. In this manner, the criteria are applied based on the type of task.

In other examples, the criteria are user specific. The criteria are customized for each user such that different threshold or other rules are applied to different users. In other examples, different criteria are applied based on the time and/or date. For example, different criteria are applied to users working on a weekday while other criteria are applied to users on weekends or holidays to account for distractions due to working from home, etc.

The ML model 202 generates a predicted visual impairment 216 level 206 of the user using the user interaction data and one or more visual impairment criteria 132. The visual assist level indicates a degree of visual impairment of the user. In other examples, the level 206 is used to indicate the presence 218 or absence 220 of a visual impairment. The ML model 202 performs an update 222 of the level 206 based on new user interaction data or updated criteria.

In some examples, the ML model 202 generates an audible visual assist (VA) activation prompt 148 via the UI of the user device 116 in response to the visual assist level 206 exceeding one or more threshold(s), such as a minimum threshold value. If user activation 224 (user consent) is received, the VA manager 140 activates the VA chatbot to assist the user in performing a task during navigation of the webpage 122. The chatbot performs speech to text 226 and text to speech 228.

Figure 3:
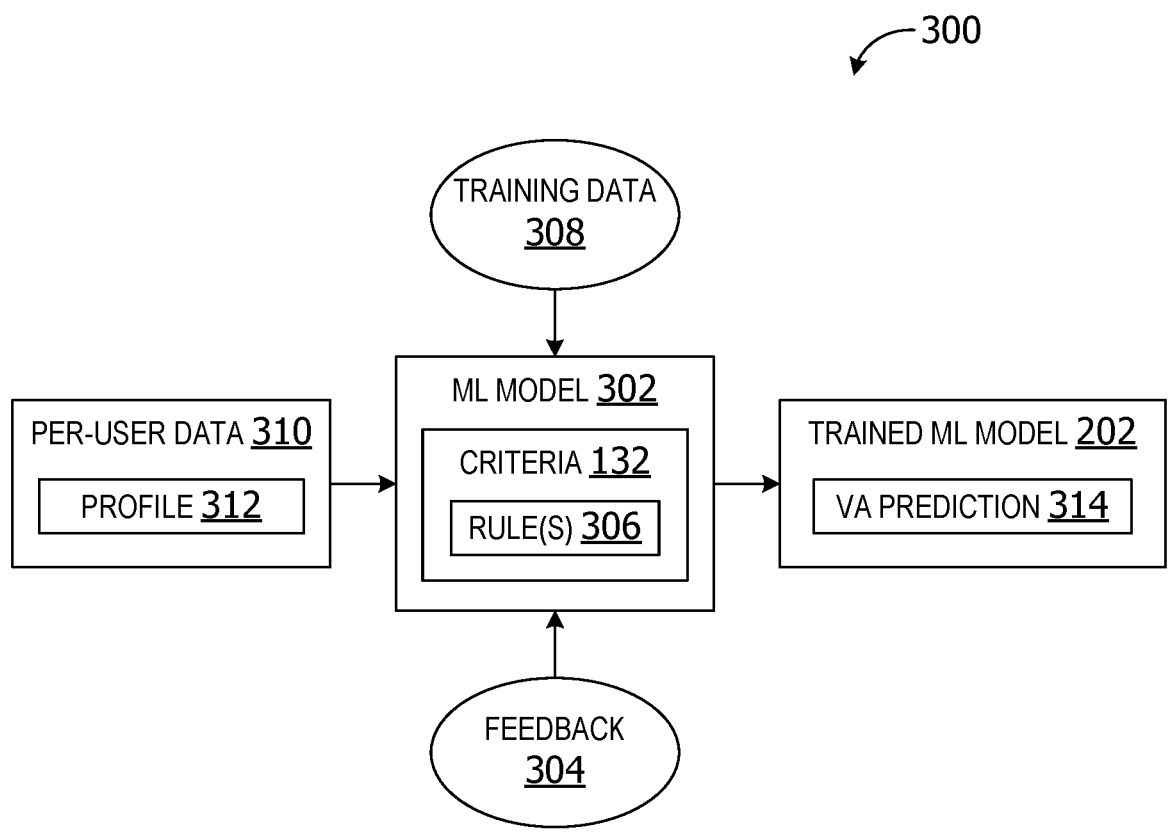
FIG. 3 is an exemplary block diagram illustrating a ML model trained to detect visual impairment of users based on user interactions with a webpage.

Referring now to FIG. 3, an exemplary block diagram illustrating a system 300 including an ML model 302 trained to detect visual impairment of users based on user interactions with a webpage is shown. The ML model 302 is any type of ML model including pattern recognition and artificial intelligence (AI) algorithms for analyzing data and learning from feedback 304. The feedback 304 is provided by users and/or from other trained ML models in a feedback loop. The trained ML model 202 updates the criteria 132, including one or more rule(s) 306, used to detect visual impairments in users based on the feedback 304.

The ML model 302 is trained using training data 308. The training data 308 in this example includes annotated data identifying detected user interactions associated with one or more visual impairments. The training data in other examples includes web traffic historical data and per-user data 310. The per-user data 310 is user-specific data associated with visually impaired users and non-visually impaired users. The per-user data 310 optionally includes historical user interaction data associated with users navigating the content of the webpage, and/or per-user customized website settings. The per-user data 310 may be stored in a profile 312. This data trains the ML model 202 for the specific webpage and webpage content for improved accuracy in generating a VA prediction 314. Detecting visual impairments and/or modifying settings of the webpage improve navigability to accommodate different types of visual impairments.

Figure 4:
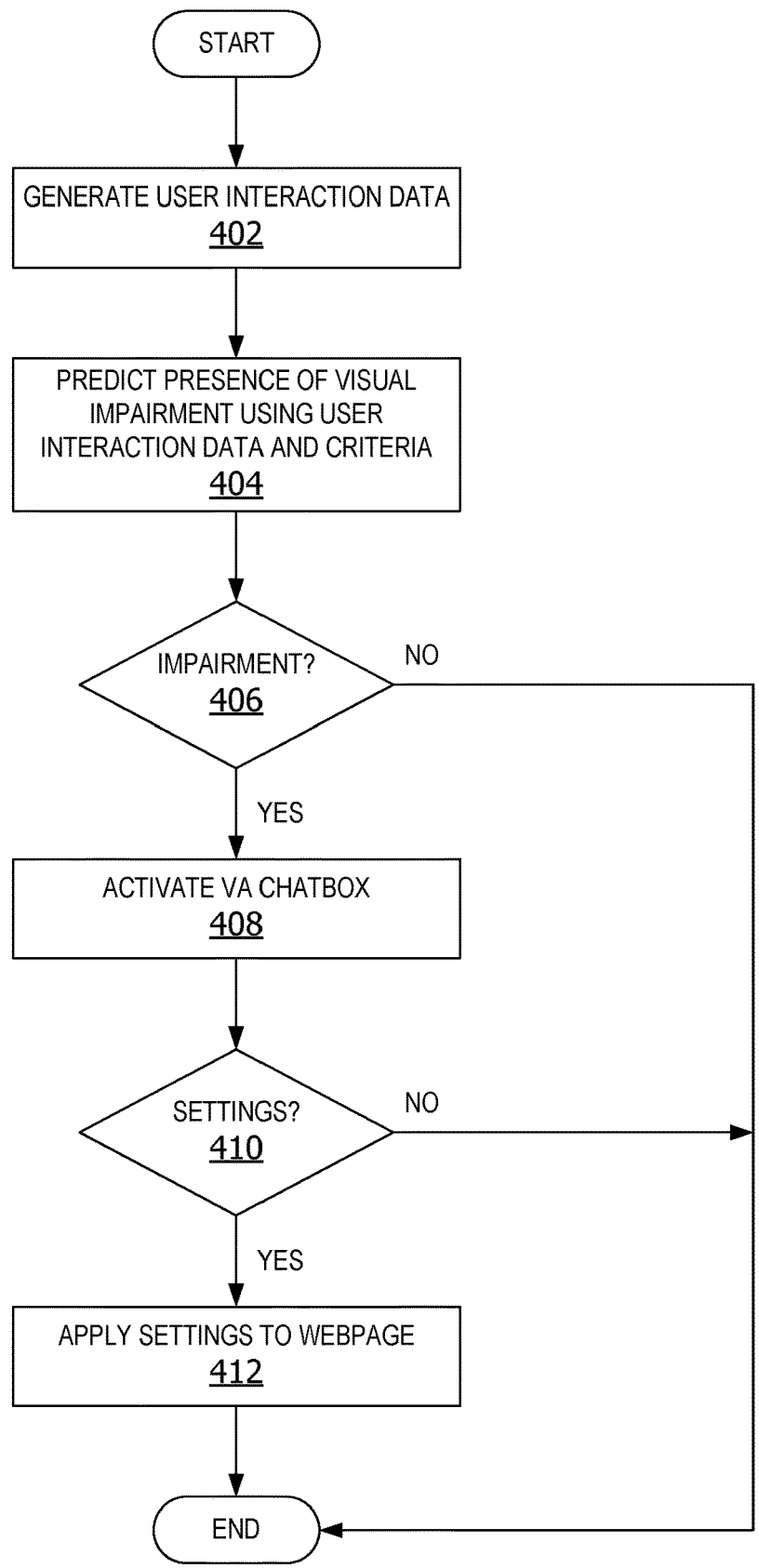
FIG. 4 is a flow chart illustrating operation of the computing device to improve accessibility of content for visually impaired users.

FIG. 4 is a flow chart illustrating operation of the computing device to improve accessibility of content for visually impaired users. The process shown in FIG. 4 is performed by a VA manager, executing on a computing device, such as the computing device 102 or the user device 116 in FIG. 1.

The VA manager generates user interaction data at 402. The user interaction data is data describing user interactions with webpage content. The VA manager predicts a presence of a visual impairment using the user interaction data and the criteria at 404. If a visual impairment is predicted at 406, the VA manager activates the VA chatbot at 408. In some examples, the VA chatbot is not activated until the user agrees to activation following output of a prompt. In this example, the VA chatbot is automatically activated without issuing a prompt. The VA manager determines if VA settings are available at 410. If yes, the settings are applied to the webpage to improve navigability and ease of use for the user at 412. The process terminates thereafter.

While the operations illustrated in FIG. 4 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 4.

Figure 5:
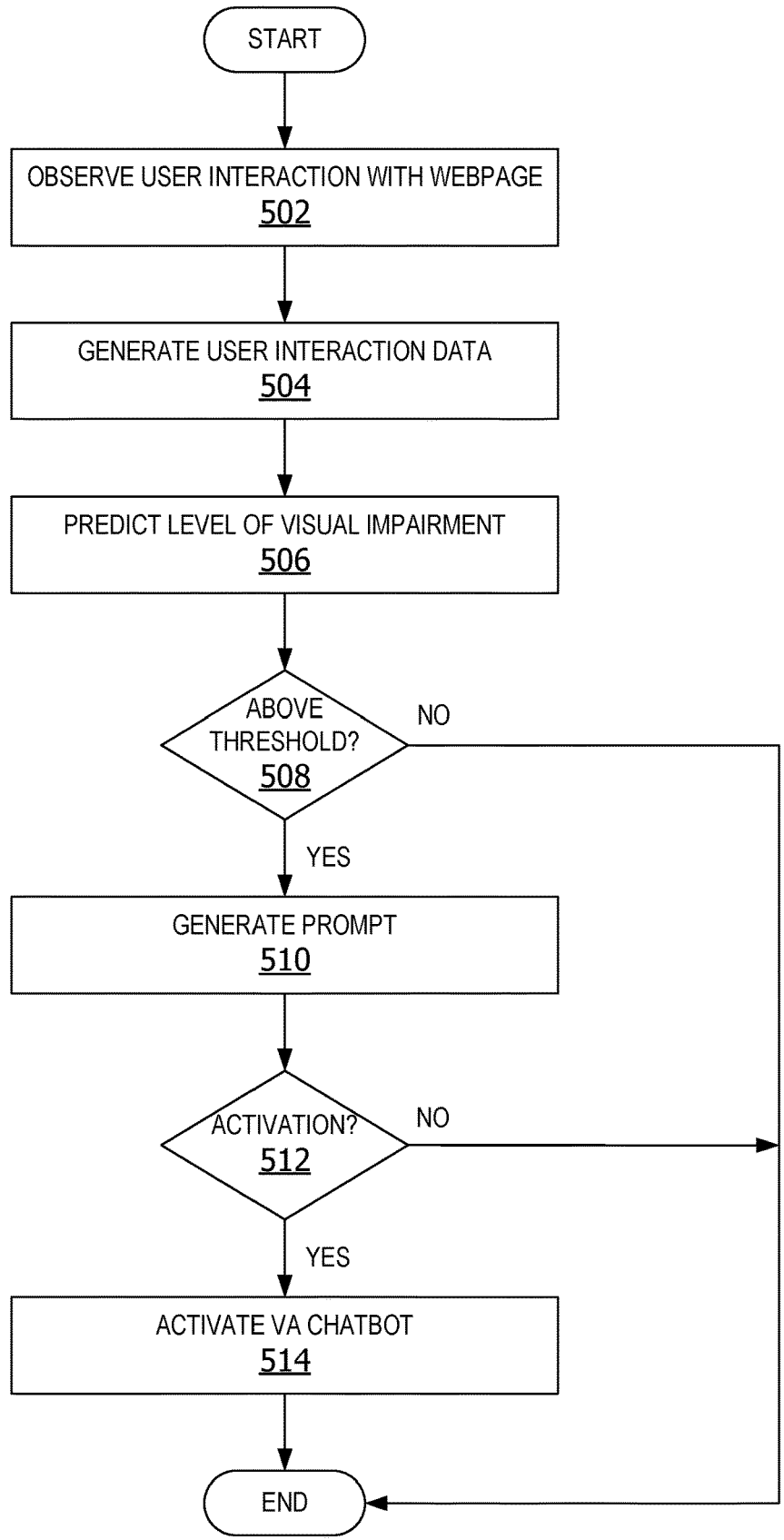
FIG. 5 is a flow chart illustrating operation of the computing device to predict visual impairment of users and activate a VA chatbot.

FIG. 5 is a flow chart illustrating operation of the computing device to predict visual impairment of users and activate a VA chatbot. The process shown in FIG. 5 is performed by a VA manager, executing on a computing device, such as the computing device 102 or the user device 116 in FIG. 1.

The VA manager observes user interaction with a webpage at 502. In this example, the user interaction includes clicking on graphics, such as buttons, icons, tabs, etc. The user interaction also includes entering text into text input fields, clicking on links, opening files, playing videos, playing audio files, obtaining information, downloading content, or any other tasks. The VA manager generates user interaction data at 504. The VA manager predicts a level of visual impairment at 506. The VA manager determines if the level of visual impairment is above a threshold minimum level of visual impairment at 508. If yes, the VA manager generates a VA activation prompt at 510. The VA manager determines if the user consents to activation of the VA chatbot at 512. If yes, the VA manager activates the VA chatbot at 514. The process terminates thereafter.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

Figure 6:
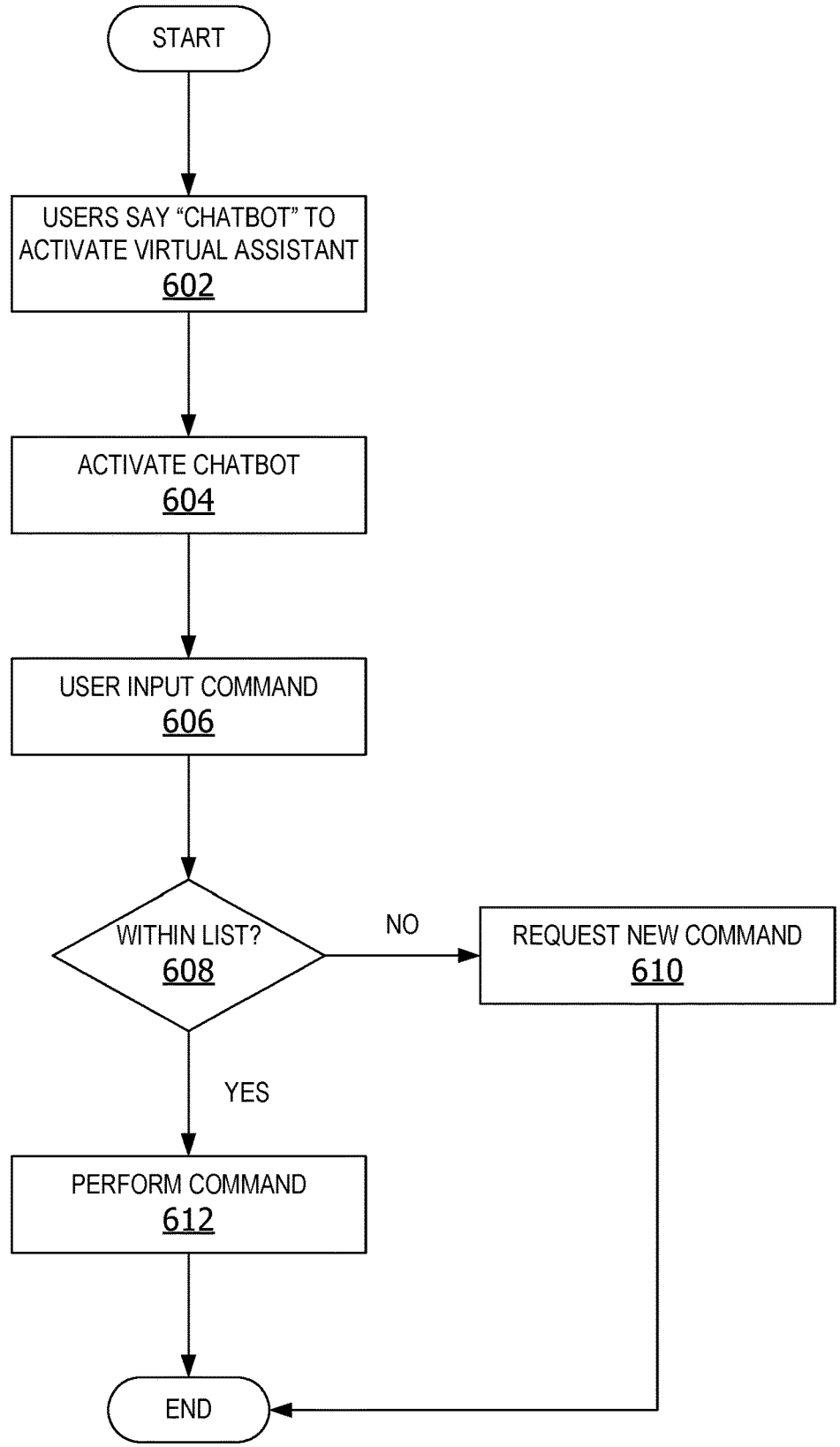
FIG. 6 is a flow chart illustrating operation of the computing device to perform commands by a chatbot to improve navigability of a webpage for users.

FIG. 6 is a flow chart illustrating operation of the computing device to perform commands by a chatbot to improve navigability of a webpage for users. The process shown in FIG. 6 is performed by a VA manager, executing on a computing device, such as the computing device 102 or the user device 116 in FIG. 1.

The process begins when users say "chatbot" to activate the virtual assistant at 602. The process is not limited to saying "chatbot" to activate the VA chatbot assistant. In other examples, any verbal command or activation phrase is spoken to activate the chatbot. In another example, the chatbot is activated by saying "visual assist chatbot," or any other suitable verbal command for activation of the chatbot. The VA manager activates the chatbot in response to the verbal command. The VA manager receives user input command at 606. The VA manager determines if the input command is within a commands list at 608. If not, the VA manager requests a new command at 610. If yes, the VA manager chatbot performs the command at 612. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
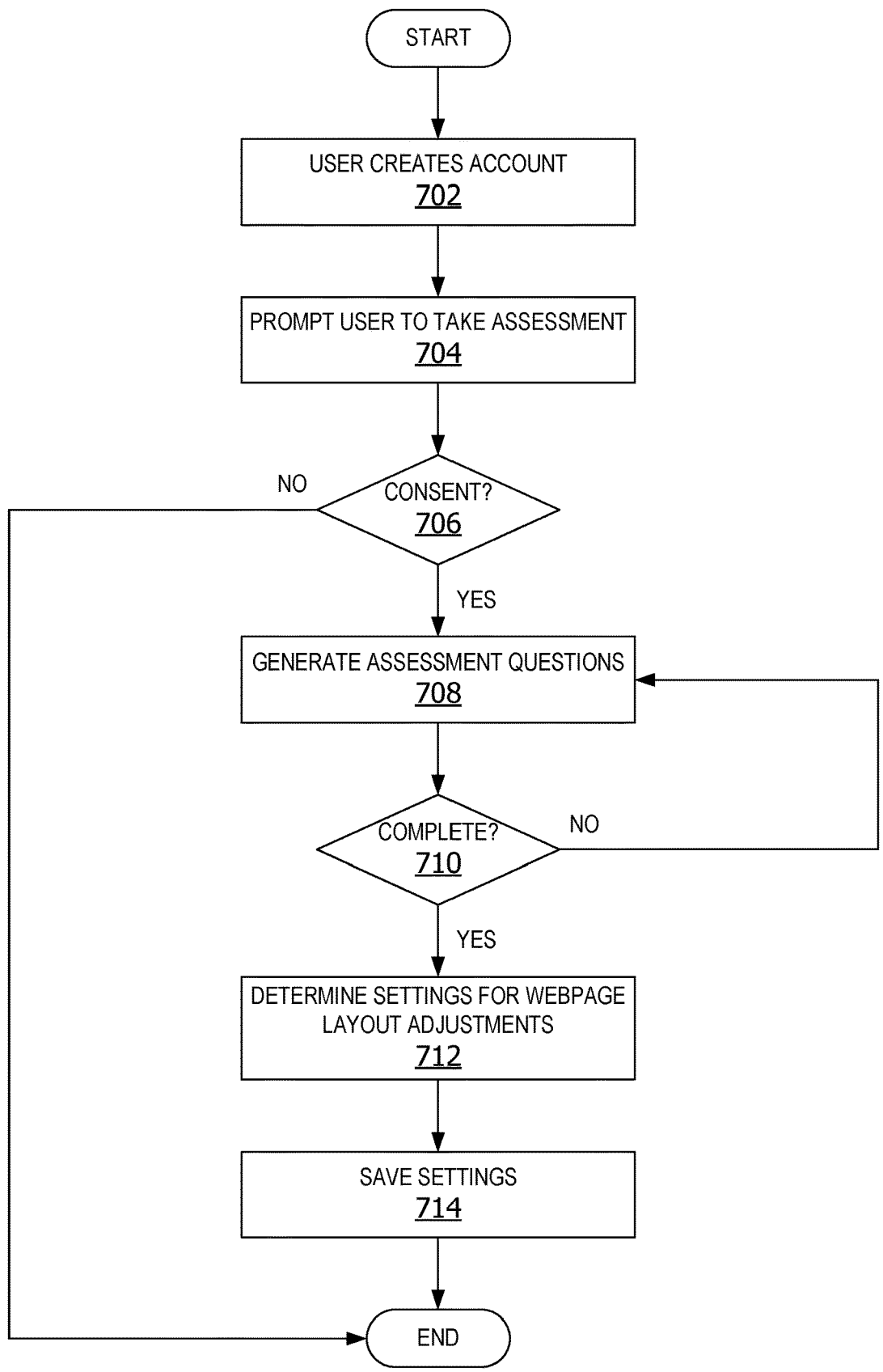
FIG. 7 is a flow chart illustrating operation of the computing device to assess visual impairment of a user and modify webpage settings.

FIG. 7 is a flow chart illustrating operation of the computing device to assess visual impairment of a user and modify webpage settings. The process shown in FIG. 7 is performed by a VA manager, executing on a computing device, such as the computing device 102 or the user device 116 in FIG. 1.

The process begins when the user creates an account at 702. The VA manager prompts the user to take a visual assessment at 704. If the user consents to the assessment at 706, the VA manager generates the assessment questions at 708. The VA manager determines if the assessment is complete at 710. If the user completes the assessment, the VA manager determines customized settings for the webpage layout adjustments based on the assessment test results at 712. The VA manager saves the settings at 714. In some examples, the settings are saved in a user profile or other user data file. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
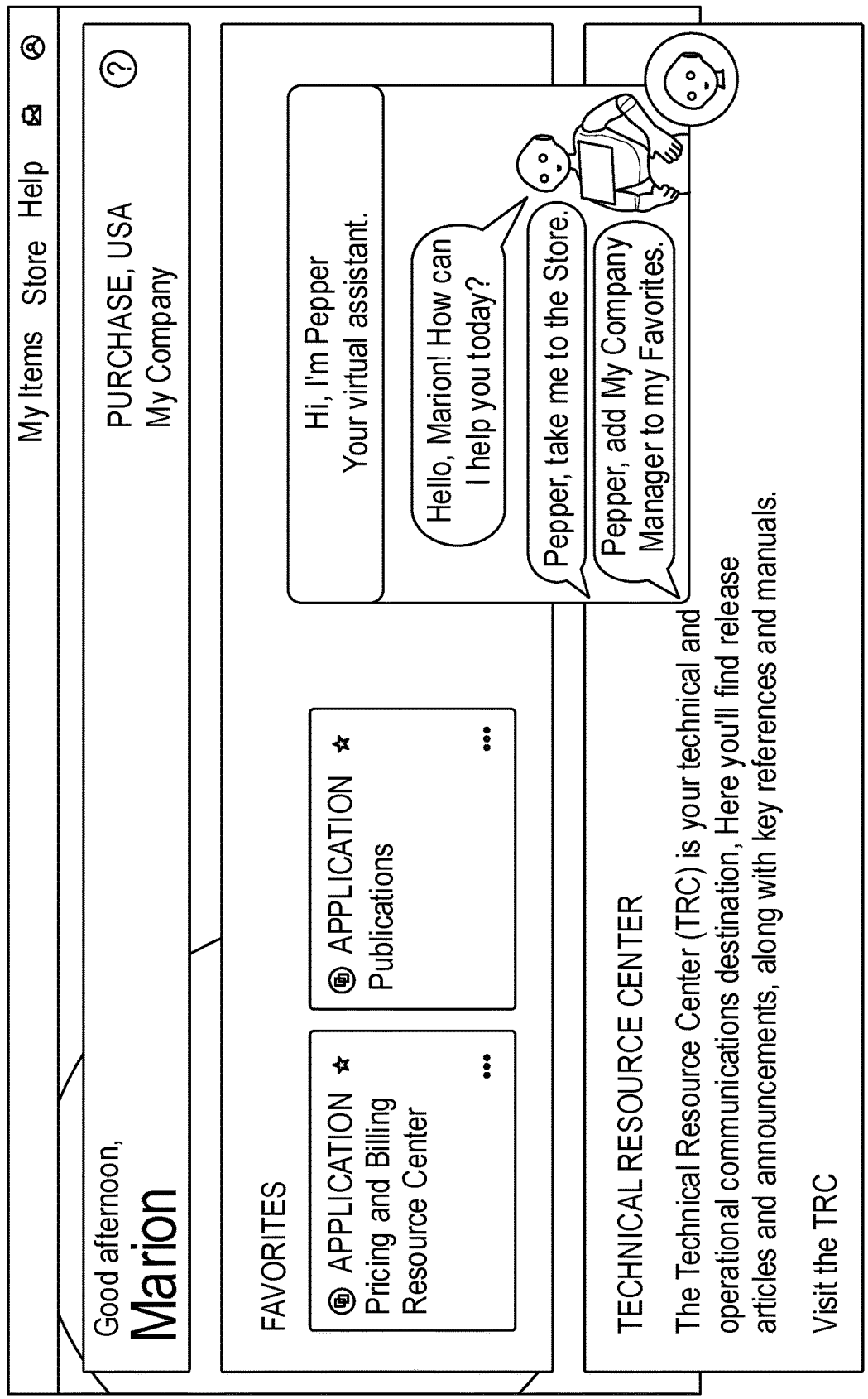
FIG. 8 is an exemplary screenshot illustrating a VA chatbot associated with a webpage.

FIG. 8 is an exemplary screenshot 800 illustrating a VA chatbot associated with a webpage. The VA chatbot receives verbal commands from the user and carries out those commands to facilitate navigation of the webpage by visually impaired users.

Figure 9:
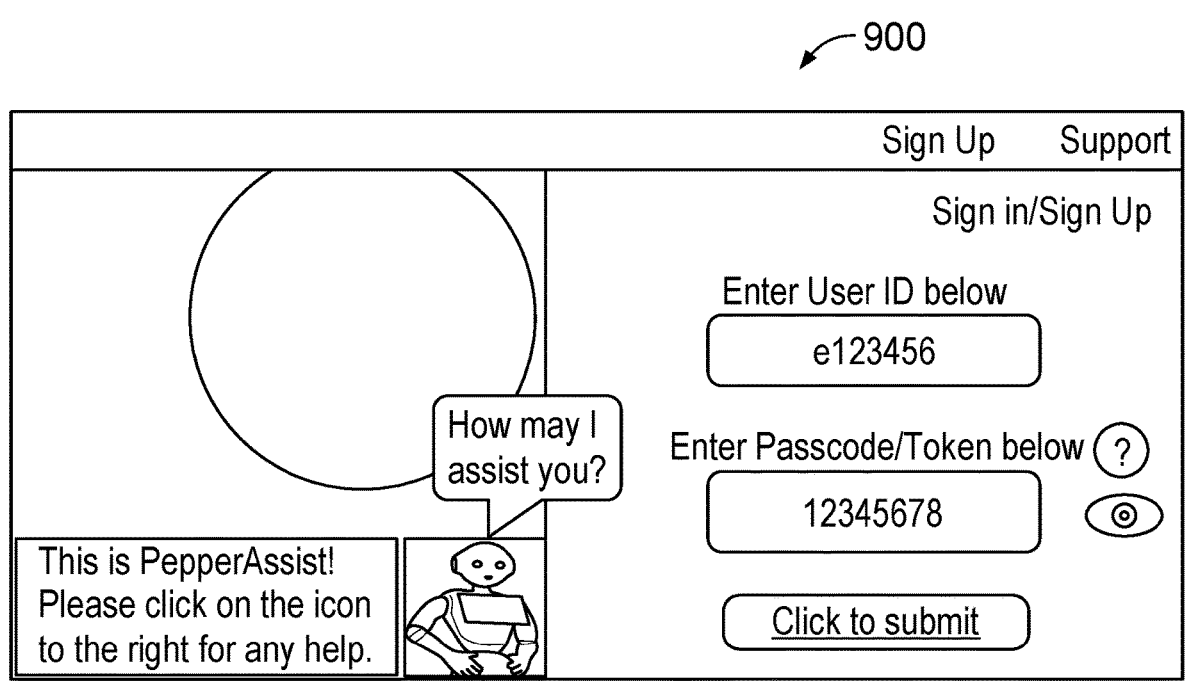
FIG. 9 is an exemplary screenshot illustrating a webpage with modified settings to accommodate a visually impaired user.

FIG. 9 is an exemplary screenshot 900 illustrating a webpage with modified settings to accommodate a visually impaired user. In this example, the content of the webpage is modified to increase the size of text boxes, remove unnecessary content which might make it more difficult for the user to navigate the webpage, and increase the font size of text presented to the user.

Exemplary Operating Environment

Figure 10:
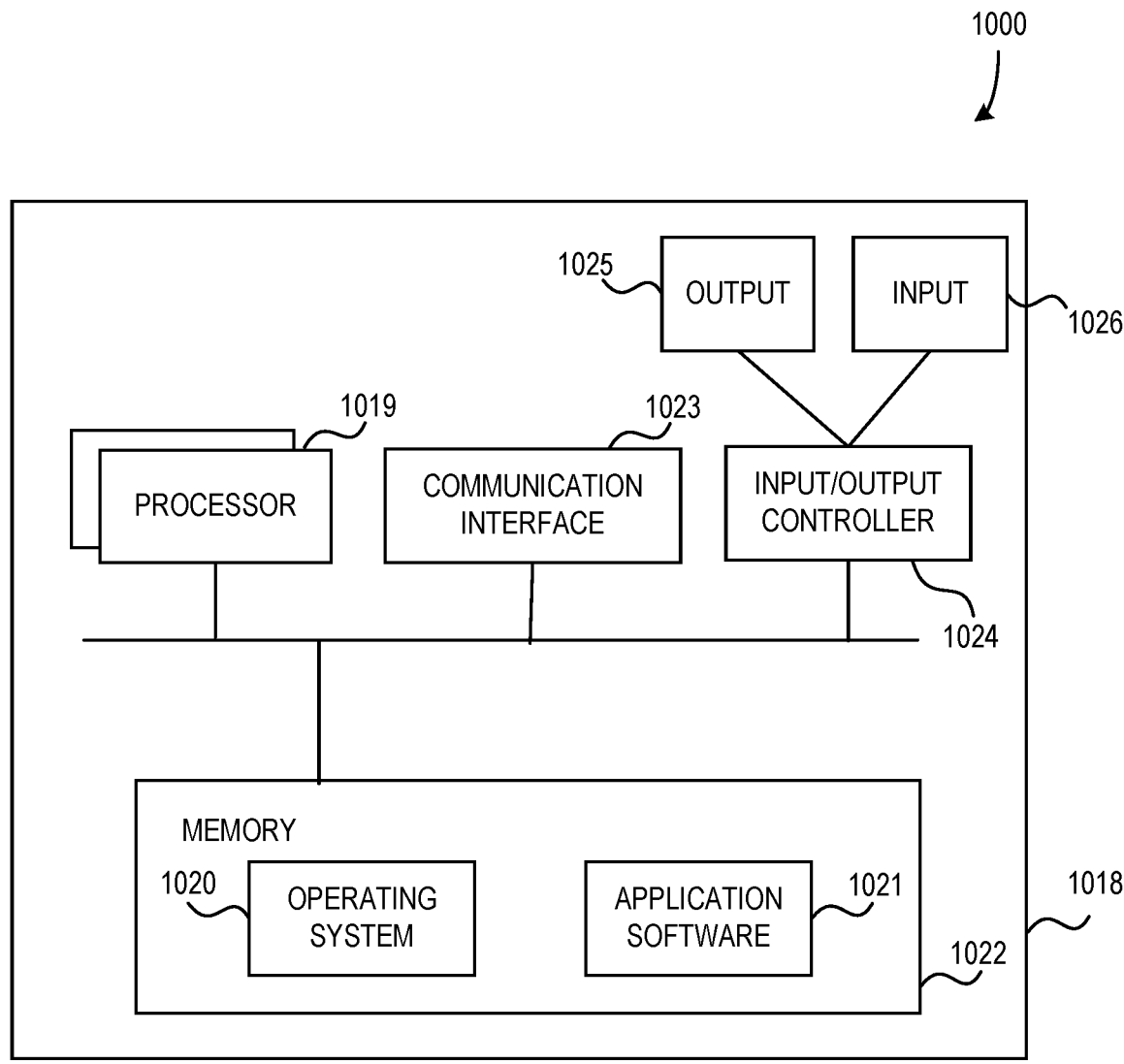
FIG. 10 is an exemplary block diagram illustrating a computing device suitable for implementing various aspects of the disclosure.

The present disclosure is operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 is a computing device, such as, but not limited to, the computing device 102 in FIG. 1.

The computing apparatus 1018 comprises one or more processors 1019 which can be microprocessors, controllers, or any other suitable type of processors for processing computer executable instructions to control the operation of the electronic device. Alternatively, or in addition, the processor 1019 is any technology capable of executing logic or instructions, such as a hardcoded machine. In some examples, platform software comprising an operating system 1020 or any other suitable platform software is provided on the apparatus 1018 to enable application software 1021 to be executed on the device. In some examples, receiving and routing RPC messages from external sources to microservice rails of a microservice platform as described herein is accomplished by software, hardware, and/or firmware.

In some examples, computer executable instructions are provided using any computer-readable media that are accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 in other examples outputs data to devices other than the output device, e.g., a locally connected printing device. In some examples, a user provides input to the input device(s) 1026 and/or receives output from the output device(s) 1025.

The functionality described herein can be performed, at least in part, by one or more hardware logic components. The computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system includes a VA manager that provides assistance to visually impaired users navigating websites. The system includes a processor and a computer-readable medium storing instructions that are operative upon execution by the processor to generate user interaction data describing user interaction with a webpage in real-time as a user navigates the webpage via a user interface (UI) device: predict a presence of a visual impairment of the user, by a trained machine learning (ML) model using the user interaction data and one or more visual impairment criteria; and activate a VA chatbot in response to the trained ML model predicting the presence of a visual impairment, where the VA chatbot assists the user in performing a task during navigation of the webpage.

An exemplary method comprises observing user interaction with a webpage in real-time as a user navigates the webpage via a UI device: generating user interaction data describing the user interaction with the webpage: predicting a visual assist level of the user by a trained machine learning (ML) model using the user interaction data and one or more visual impairment criteria, the visual assist level indicating a degree of visual impairment of the user: generating an audible visual assist (VA) activation prompt via the UI device in response to the visual assist level exceeding a threshold minimum value; and activating a VA chatbot to assist the user in performing a task during navigation of the webpage in response to VA activation by the user.

One or more computer storage media have computer-executable instructions that, upon execution by a processor, cause the processor to at least: generate user interaction data describing user interaction with a webpage in real-time as a user navigates the webpage via a user interface (UI) device: predict a presence of a visual impairment associated with the user, by a trained machine learning (ML) model using the user interaction data and one or more user-configurable visual impairment criteria: generate an audible visual assist (VA) activation prompt via the UI device in response to the trained ML model predicting the presence of the visual impairment; and activate a VA chatbot to assist the user in performing a task during navigation of the webpage in response to VA activation by the user.

In some examples, the system enhances the user-experience navigating webpages for visually impaired users with automated visual adjustments and a virtual assistant. The system provides end-to-end personalized user-experience tailored to a user's visual impairments (such as being color blind, having low vision or blind) on a website. In some examples, the VA manager automatically predicts whether the user is likely to have a visual impairment based on user interaction data for the user. However, in other examples, the VA manager optionally provides a one-time visual impairment assessment consisting of few quick scientifically established exercises to assess the user's visual capabilities. This assessment is offered at account creation time and/or periodically to update the assessment of the user's capabilities.

In other examples, the VA manager automatically calibrates the website's visual layout to provide a user-experience that is customized to the user's visual impairment to help them better navigate the platform. The per-user customized website settings are saved in a user profile for all future authentication/access. This enables automatic customization of the webpage layout to the unique requirements and preferences of each user.

In still other examples, the VA manager automatically activates a VA chatbot for users which are predicted to have a visual impairment. In other examples, the VA chatbot is activated in response to a user request to activate the chatbot or in response to user consent following output of a VA activation prompt. The VA chatbot helps the user execute certain asks and removes undue burdens of navigating the webpage.

In an example scenario, when the user logs into the webpage or launches the VA chatbot, the user is invited to take a visual assessment test which consists of three exercises taking approximately ninety seconds to complete. The assessment results are used to assess visual capability of the user. The visual layout settings of the webpage are calibrated to the user based on the visual impairment level/classification of the user. This provides the user-experience customized to the user impairment. The settings are saved and applied to the webpage when the user visits the webpage in the future.

In another example scenario, the VA manager assesses the level of visual impairment based on the user's interactions with the webpage without performing an assessment test. The VA manager launches the chatbot and calibrates the webpage settings based on the level/classification of the user's visual impairment to make internal websites and portals more accessible for users with visual impairments.

In one example, the ML manager observes user interaction with a web page. The ML manager uses ML to conclude that the user might be visually impaired. The ML manager generates a voice prompt asking the user if they want assistance. If so, the ML manager activates a chatbot to help the user perform tasks on the web site (e.g., complete a transaction, obtain info from the website, and just generally navigate). The ML manager observes the user to analyze typical 'miss' and 'hit' info (when mouse clicks land correctly or not). This is a user-specific observation and analysis. The ML model in this example is trained to be specific to the user. The ML manager provides a VA chatbot which is used by blind or visually impaired persons while navigating a webpage for improved accuracy, fewer instances of click misses, reduced network resource usage as navigation time is further reduced, etc. This provides users with a more seamless and inclusive experience.

In still another example, the VA manager is activated when the user enters web or mobile interface and interacts by navigating webpages, logging in, and performing digital tasks. The VA manager AI solution detects visual impairment by identifying signs of visual impairment. Based on AI detection, the VA Chatbot assistant automatically starts and helps with user commands, task execution, visual adjustments, and more. Machine learning allows the system to keep learning and improving overtime to better detect and better support visually impaired users.

Alternatively, or in addition to the other examples described herein, examples include any combination of the following:

generate an audible visual assist (VA) activation prompt via the UI device in response to the trained ML model predicting a user has a visual impairment;

wherein the VA chatbot is activated upon receipt of user input requesting activation of the VA chatbot following output of the audible VA activation prompt;

generate an audible visual assist (VA) activation prompt via the UI device in response to the trained ML model predicting that user has the visual impairment;

receive activation of a VA manager in response to the VA activation prompt;

apply a set of user-specific visual assist settings to the webpage altering a layout and appearance of graphics within the webpage in response to the user activating a VA manager;

wherein the user interaction data comprises a number of navigation errors of the user occurring within a predetermined period of time;

wherein the visual impairment criteria comprises a minimum threshold number of navigation errors;

generate a predicted visual assist level using the number of navigation errors, wherein the number of navigation errors exceeding the minimum threshold number of navigation errors indicates the presence of the visual impairment, and wherein the trained ML model predicts an absence of the visual impairment in response to the number of navigation errors falling below the minimum visual impairment threshold;

apply a first visual impairment criteria to a first user interaction data associated with a first task performed by the user;

apply a second visual impairment criteria to a second user interaction data associated with a second task performed by the user, wherein different criteria are applied during analysis of data describing user interaction with the webpage while performing different tasks by the trained ML model predicting the presence of the visual impairment of the user;

update a status of the user indicating a change in a visual assist level in accordance with updated user interaction data reflecting an increase in navigation errors;

receive a verbal command from the user;

initiate performance of a task in accordance with the verbal command, by the VA chatbot;

observing user interaction with a webpage in real-time as a user navigates the webpage via a UI device;

generating user interaction data describing the user interaction with the webpage;

predicting a visual assist level of the user by a trained machine learning (ML) model using the user interaction data and visual impairment criteria, the visual assist level indicating a degree of visual impairment of the user;

generating an audible visual assist (VA) activation prompt via the UI device in response to the visual assist level exceeding a threshold minimum value;

activating a VA chatbot to assist the user in performing a task during navigation of the webpage in response to VA activation by the user;

receiving activation of a VA manager in response to the VA activation prompt;

applying a set of user-specific visual assist settings to the webpage altering a layout and appearance of graphics within the webpage in response to the user activating a VA manager;

generating the predicted visual assist level using the number of navigation errors, wherein the number of navigation errors within a threshold range indicates the presence of the visual impairment;

applying a first visual impairment criteria to first user interaction data associated with a first task performed by the user;

applying a second visual impairment criteria to second user interaction data associated with a second task performed by the user;

updating a status of the user indicating a change in the visual assist level in accordance with updated user interaction data reflecting an increase in navigation errors;

receiving a verbal command from the user;

initiating performance of a task automatically in accordance with the verbal command, by the VA chatbot; and updating the visual impairment criteria, by the trained ML model, in response to feedback received from the user.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for observing user interaction with a webpage: generating user interaction data describing user interaction with the webpage: predicting a presence of a visual impairment associated with the user, by a trained machine learning (ML) model using the user interaction data and one or more user-configurable visual impairment criteria: generating an audible visual assist (VA) activation prompt via the UI device in response to the trained ML model predicting the presence of the visual impairment; and activating a VA chatbot to assist the user in performing a task during navigation of the webpage in response to VA activation by the user.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing assistance to a visually impaired user navigating a website, the system comprising:
   a processor; and
   a computer-readable medium storing instructions that are operative upon execution by the processor to:

generate user interaction data describing user interaction with a webpage in real time as a user navigates the webpage via a user interface (UI) device, the user interaction data being generated without applying a visual impairment test or evaluation, the user interaction data comprising a number of navigation errors of the user with the webpage occurring within a period of time, the number of navigation errors being a count of user misses during attempted clicking of components of the webpage;

based on generating the user interaction data, predict a presence of a visual impairment of the user, by a trained machine learning (ML) model using the user interaction data and one or more visual impairment criteria, the visual impairment criteria comprising a minimum threshold number of navigation errors;

generate a predicted visual assist (VA) level using the number of navigation errors, wherein the number of navigation errors exceeding the minimum threshold number of navigation errors indicates the presence of the visual impairment, and wherein the trained ML model predicts an absence of the visual impairment in response to the number of navigation errors falling below the minimum threshold number of navigation errors;

modify a layout of the webpage in response to the VA level exceeding a threshold VA level, modifying the layout comprising increasing a font size of text on the webpage, increasing a size of text boxes on the webpage, and removing content of the webpage to decrease a difficulty of webpage navigation;

cause an audible activation prompt to be output to the user, the audible activation prompt requesting whether the user wants to activate a VA chatbot; and activate the VA chatbot in response to the trained ML model predicting the presence of the visual impairment and in response to an affirmative response to the audible activation prompt, the VA chatbot configured to perform text-to-speech and to assist the user in performing a task during navigation of the webpage.

2. The system of claim 1, wherein the instructions are further operative to:
store the user interaction data and the modified webpage layout in a user profile; and
automatically customize a webpage layout of a future webpage visited by the user based on the modified webpage layout in the user profile.

3. The system of claim 2, wherein the instructions are further operative to:
apply a first visual impairment criteria to the user interaction data associated with a first task performed by the user; and
apply a second visual impairment criteria to the user interaction data associated with a second task performed by the user, wherein different criteria are applied during analysis of data describing user interaction with the webpage while performing different tasks by the trained ML model predicting the presence of the visual impairment of the user.

4. The system of claim 3, wherein the instructions are further operative to:
training the trained ML model with updated training data, wherein the updated training data is based on the user interaction data stored in the user profile.

5. The system of claim 4, wherein the instructions are further operative to:
receive a verbal command from the user; and
initiate performance of a task in accordance with the verbal command, by the VA chatbot.

6. A method for providing assistance to a visually impaired user navigating a website, the method comprising:
observing user interaction with a webpage in real time as a user navigates the webpage via a user interface (UI) device;
capturing user interaction data describing the user interaction with the webpage, the user interaction data being generated without applying a visual impairment test or evaluation, the user interaction data comprising a number of navigation errors of the user with the webpage occurring within a period of time, the number of navigation errors being a count of user misses during attempted clicking of components of the webpage;
based on capturing the user interaction data, predicting a visual assist (VA) level of the user by a trained machine learning (ML) model using the user interaction data and one or more visual impairment criteria, the visual assist level indicating a degree of visual impairment of the user, the one or more visual impairment criteria comprising a minimum threshold number of navigation errors, wherein the number of navigation errors exceeding the minimum threshold number of navigation errors indicates a presence of the visual impairment, and wherein the trained ML model predicts an absence of the visual impairment in response to the number of navigation errors falling below the minimum threshold number of navigation errors;
modifying a layout of the webpage in response to the VA level exceeding a threshold VA level, modifying the layout comprising increasing a font size of text on the webpage, increasing a size of text boxes on the webpage, and removing content of the webpage to decrease a difficulty of webpage navigation;
generating an audible VA activation prompt via the UI device in response to the visual assist level exceeding a threshold minimum value, the audible VA activation prompt requesting whether the user wants to activate a VA chatbot; and
activating the VA chatbot, wherein the VA chatbot is configured to perform text-to-speech and to assist the user in performing a task during navigation of the webpage in response to VA activation by the user.

7. The method of claim 6, further comprising:
storing the user interaction data and the modified webpage layout in a user profile; and
automatically customizing a webpage layout of a future webpage visited by the user based on the modified webpage layout in the user profile.

8. The method of claim 7, further comprising:
applying a first visual impairment criteria to the user interaction data associated with a first task performed by the user; and
applying a second visual impairment criteria to the user interaction data associated with a second task performed by the user, wherein different criteria are applied during analysis of data describing user interaction with the webpage while performing different tasks by the trained ML model predicting the presence of the visual impairment of the user.

9. The method of claim 6, further comprising:
training the trained ML model with updated training data, wherein the updated training data is based on the user interaction data stored in the user profile.

10. The method of claim 9, further comprising:
receiving a verbal command from the user; and
initiating performance of a task automatically in accordance with the verbal command, by the VA chatbot.

11. The method of claim 10, further comprising:
updating the visual impairment criteria, by the trained ML model, in response to feedback received from the user.

12. A non-transitory computer storage device having computer-executable instructions stored thereon, which, upon execution by a computer, cause the computer to perform operations comprising:
generating user interaction data describing user interaction with a webpage in real time as a user navigates the webpage via a user interface (UI) device, the user interaction data being generated without applying a visual impairment test or evaluation, the user interaction data comprising a number of navigation errors of the user with the webpage occurring within a period of time, the number of navigation errors being a count of user misses during attempted clicking of components of the webpage;
based on generating the user interaction data, predicting a presence of a visual impairment associated with the user, by a trained machine learning (ML) model using the user interaction data and one or more visual impairment criteria, the visual impairment criteria comprising a minimum threshold number of navigation errors;
generating a predicted visual assist (VA) level using the number of navigation errors, wherein the number of navigation errors exceeding the minimum threshold number of navigation errors indicates the presence of the visual impairment, and wherein the trained ML model predicts an absence of the visual impairment in response to the number of navigation errors falling below the minimum threshold number of navigation errors;
modify a layout of the webpage in response to the VA level exceeding a threshold VA level, modifying the layout comprising increasing a font size of text on the webpage, increasing a size of text boxes on the webpage, and removing content of the webpage to decrease a difficulty of webpage navigation;
generating an audible VA activation prompt via the UI device in response to the trained ML model predicting the presence of the visual impairment, the audible VA activation prompt requesting whether the user wants to activate a VA chatbot; and
activating the VA chatbot, wherein the VA chatbot configured to perform text-to-speech and to assist the user in performing a task during navigation of the webpage in response to VA activation by the user.

13. The non-transitory computer storage device of claim 12, wherein the operations further comprise:
storing the user interaction data and the modified webpage layout in a user profile; and
automatically customizing a webpage layout of a future webpage visited by the user based on the modified webpage layout in the user profile.

14. The non-transitory computer storage device of claim 13, wherein the operations further comprise:
applying a first visual impairment criteria to the user interaction data associated with a first task performed by the user; and
applying a second visual impairment criteria to the user interaction data associated with a second task performed by the user, wherein different criteria are applied during analysis of data describing user interaction with the webpage while performing different tasks by the trained ML model predicting the presence of the visual impairment of the user.

15. The non-transitory computer storage device of claim 14, wherein the operations further comprise:
training the trained ML model with updated training data, wherein the updated training data is based on the user interaction data stored in the user profile.

16. The non-transitory computer storage device of claim 15, wherein the operations further comprise:
updating the visual impairment criteria by the trained ML model in accordance with feedback received from the user.

17. The non-transitory computer storage device of claim 16, wherein the visual impairment criteria further comprise:
a threshold webpage magnification percentage.

18. The non-transitory computer storage device of claim 17, wherein the visual impairment criteria further comprise:
a threshold amount of back-and-forth movement during navigation.

19. The non-transitory computer storage device of claim 18, wherein the visual impairment criteria further comprise:
use of a keyboard for webpage navigation.

20. The non-transitory computer storage device of claim 19, wherein the visual impairment criteria further comprise:
a presence of a low color contrast mode on the UI device.

* * * * *